May 31, 1932.  E. B. SMITH  1,861,245
SYSTEM OF MOTOR CONTROL
Filed Sept. 7, 1929
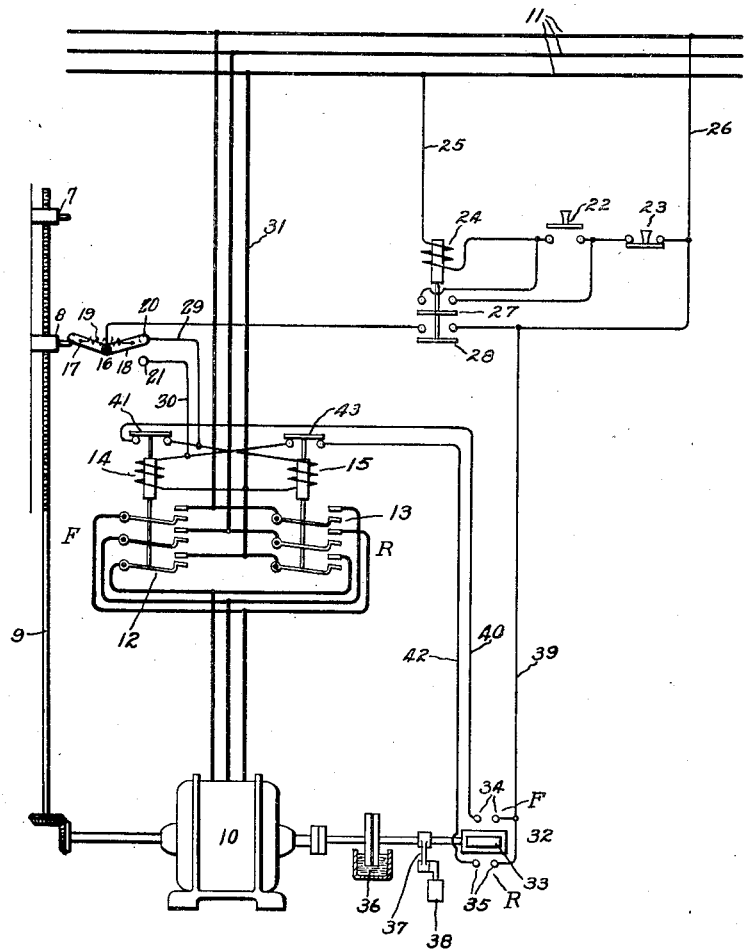
Inventor:
Edward B. Smith,
by Charles E. Tullar
His Attorney.

Patented May 31, 1932

1,861,245

UNITED STATES PATENT OFFICE

EDWARD B. SMITH, OF CLEVELAND, OHIO, ASSIGNOR TO GENERAL ELECTRIC COMPANY, A CORPORATION OF NEW YORK

SYSTEM OF MOTOR CONTROL

Application filed September 7, 1929. Serial No. 391,053.

My invention relates to control systems for electric motors, more particularly to reversing motor control systems such as used with motor driven machine tools and the like, and has for its object the provision of simple, reliable and efficient means for controlling an electric motor.

More particularly my invention relates to control means for plugging the motor to rest when its circuit is opened for either direction of rotation. In carrying out my invention in one form, I provide control means actuated in dependence upon the direction of rotation of the motor for establishing plugging connections when the motor circuit is opened, i. e., the motor is reconnected to the line but for reverse rotation whereby it is brought to rest very quickly, the motor circuit then being opened to prevent reverse rotation.

For a more complete understanding of my invention, reference should be had to the accompanying drawing, the single figure of which is a diagrammatic representation of a system of motor control embodying my invention.

Referring to the drawing, I have shown my invention in one form as applied to a reversing motor control system in which the motor is automatically reversed by a limit switch at each end of its travel so as to drive the load (not shown), such as a machine tool or the like, back and forth between predetermined limits. As shown, the driving motor is constituted by a three phase electric motor 10, preferably of a squirrel cage induction type, which may be connected to a three phase supply source 11 by means of reversing switches 12 and 13 for forward and reverse rotation respectively. The switches 12 and 13 are actuated by means of operating coils 14 and 15 each of which when energized moves its respective switch to closed circuit postion. The coils are selectively energized by means of a limit switch 16 of any suitable type. As shown, this limit switch comprises an arm 17 which is moved from one position to another by any suitable means, such for example as the traveling nuts 7 and 8 actuated by the motor driven shaft 9 as the load driven by the motor arrives at each time limit of its travel, whereby the switch arm 18 is snapped by means of its biasing spring 19 from one position to another so as to alternately engage the contacts 20 and 21. In this manner the coils 14 and 15 are alternately energized to reverse the motor at each limit of its travel.

Preferably the motor is controlled by a push button system, and I have shown a push button 22, which is normally open, for controlling the starting operation as well as a normally closed push button 23 for stopping the motor. These two push buttons are connected in series with each other and in series with an operating coil 24 to the supply source 11, this connection being effected through conductors 25 and 26. The coil 24 operates two normally open relay switches 27 and 28, which are both closed when the coil is energized by depression of the button 22. The switch 27 closes a shunt circuit around the button 22 so that the button may be immediately released, while the switch 28 closes a circuit through conductor 26, the switch arm 18 to one or the other of the contacts 20 and 21, depending upon the position of the switch arm. From this point the circuit leads through a conductor 29 or 30, to the coil 15 or 14, and thence to the conductor 31 leading to the supply source 11. When the stop button 23 is depressed it will be observed that the coil 24 is deenergized whereby the switches 27 and 28 are opened. This of course, opens the holding circuit around the button 22 and opens the circuit for the coil 14 or 15 as the case may be.

For the purpose of effecting the plugging of the motor to rest when the stop button 23 is pressed at any time regardless of the direction of rotation of the motor, I have provided a suitable switching device 32 which is connected to be driven directly from the shaft of the motor 10. This device may be substantially as described and claimed in the Townsend Patent No. 1,677,008. Briefly stated, it comprises a contact member 33 which is moved upon rotation of the motor shaft into bridging engagement with one or another of the pairs of contacts 34 and 35, depending upon the direction of rotation of the motor. A frictional driving connection is provided, for example, through the agency of a fluid 36 whereby when either pair of contacts are engaged no further movement of the bridging contact 33 occurs. Furthermore, when the motor shaft comes to rest, the bridging contact since it is not biased in either direction by movement of the motor, is moved to an intermediate position between the contacts 34 and 35 by a suitable biasing means such as a crank arm 37 provided with a weight 38 or suitable biasing, or centering springs.

One contact of each of the pairs 34 and 35 is connected through a conductor 39 and conductor 26 to the supply source 11. The remaining contact of the pair 34 is connected through a conductor 40 and a normally closed relay switch 41, operated by the switch 12, to the conductor 29 leading to the coil 15. In a similar manner the remaining contact of the pair 35 is connected through a conductor 42 and the normally closed relay switch 43, actuated by switch 13, to the conductor 30 leading to the coil 14.

The operation of the starting, stopping and reversing apparatus will be clearly understood from the previous description, the motor being started simply by the momentary depression of the button 22 after which the motor operates first in one direction and then in the other, it being automatically reversed at the end of its travel. In case it is desired to stop the motor the button 23 is depressed whereby the coil 14 or 15 of the switch then closed is deenergized as previously described. Assuming that the limit switch 16 is in the position shown then the coil 15 would be energized and the switch 13 closed for one direction of operation of the motor. Under these conditions the bridging contact 33 would be in engagement with the pair of contacts 35, but this does not complete a circuit at this time due to the fact that the switch 43 in that circuit is maintained open by the closure of the switch 13. However, in case the button 23 is depressed, it will be observed that the switch 13 in opening closes switch 43 whereby a circuit is completed from the supply source 11, through conductors 26 and 39, switch 32, conductor 42, switch 43, and coil 14 to the conductor 31. This energizes the coil 14 whereby the switch 12 is closed and the motor thereby connected to the supply source for plugging operation. As the motor speed is reduced the switch 32 will open in accordance with its bias at some predetermined low speed as desired. This may be varied by adjusting the biasing of the switch. Preferably the switch 32 will be opened just prior to the stopping of the motor whereby the switch 12 is opened and the motor disconnected from the supply source. It will then coast slightly and come to rest.

The operation of the stopping means in the event that the motor is operating in the reverse direction will be clear from the previous description. In the latter case the bridging contact 33 would be in engagement with the contacts 34 so that the switch 13 would be closed to effect the plugging connection for this direction of rotation.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. A reversing motor control system for machine tools and the like, comprising an electric motor, forward and reverse contactors for controlling the direction of rotation of the motor, a switch operated by said motor to operate said contactors at predetermined limits of motor operation to reverse the direction of rotation of the motor, a control circuit including a manually operated stop button for opening said contactors and an auxiliary switch device operable responsively to the direction of rotation of the motor and operation of said stop button for controlling said contactors to plug said motor to rest irrespectively of its direction of rotation when said stop button is operated.

2. A reversing motor control system for machine tools and the like comprising an electric motor, a source of supply, forward and reverse contactors for connecting said motor with said source for forward and reverse operation, a separate control winding for each of said contactors, a control circuit connected with said source and including normally open contacts, a manually operated start button and a switching device controlled thereby for closing said contacts to close one of said contactors to start said motor, a limit switch operated by said motor at predetermined limits of its operation for selectively connecting said control windings to said control circuit to reverse the direction of rotation of said motor, a stop button for deenergizing said switching device to open said control circuit and said contactors to disconnect said motor from said source, and a switching device operable in response to the operation of said stop button and the direction of rotation of said motor for operating said contactors to plug said motor to rest irrespectively of its previous direction of rotation.

In witness whereof, I have hereunto set my hand this 3rd day of Sept., 1929.

EDWARD B. SMITH.